US009723863B2

(12) United States Patent
Njaastad et al.

(10) Patent No.: US 9,723,863 B2
(45) Date of Patent: Aug. 8, 2017

(54) BATCH CARBONATOR AND METHOD OF FORMING A CARBONATED BEVERAGE

(71) Applicant: Cornelius, Inc., St. Paul, MN (US)

(72) Inventors: David K. Njaastad, Palatine, IL (US); Scott Sevcik, Crystal Lake, IL (US); Peter S. Tinucci, Wheaton, IL (US)

(73) Assignee: Cornelius, Inc., St. Paul, MN (US)

( * ) Notice: Subject to any disclaimer, the term of this patent is extended or adjusted under 35 U.S.C. 154(b) by 5 days.

(21) Appl. No.: 14/803,513

(22) Filed: Jul. 20, 2015

(65) Prior Publication Data

US 2016/0015074 A1    Jan. 21, 2016

Related U.S. Application Data

(62) Division of application No. 13/790,687, filed on Mar. 8, 2013, now Pat. No. 9,114,368.

(51) Int. Cl.
*B01F 3/04*    (2006.01)
*A23L 2/00*    (2006.01)
(Continued)

(52) U.S. Cl.
CPC    *A23L 2/54* (2013.01); *A23L 2/00* (2013.01); *B01F 3/04106* (2013.01);
(Continued)

(58) Field of Classification Search
CPC .............. B01F 3/04815; B01F 3/04106; B01F 3/04787; B01F 3/04; A23L 2/00; A23L 2/54
(Continued)

(56) References Cited

U.S. PATENT DOCUMENTS

| 1,365,183 A | 1/1921 | Moffatt |
| 1,561,036 A | 11/1925 | Sugden |

(Continued)

FOREIGN PATENT DOCUMENTS

| CN | 1060073 | 4/1992 |
| CN | 2134366 | 5/1993 |

(Continued)

OTHER PUBLICATIONS

Kycon, Inc., KLDPX-0207-x-DC Power Jack, Panel Mount drawing, Jan. 18, 2008.

(Continued)

*Primary Examiner* — Robert A Hopkins
(74) *Attorney, Agent, or Firm* — Andrus Intellectual Property Law, LLP

(57) ABSTRACT

A batch carbonation apparatus includes a housing defining a vessel cavity. The housing includes an agitation mechanism. The pressure vessel includes a cap that has a CO2 inlet and a CO2 outlet is provided. The pressure vessel also includes a seal. The pressure vessel is moveable into an out of the vessel cavity. A locking mechanism is provided and is attached to the agitation mechanism to removably lock the cap and seal relative to the pressure vessel. A CO2 source is connected to a plurality of valves where each valve has a differing pressure. A selection toggle is attached to the housing. A control mechanism is coupled to the plurality of valves. A user selects a desired carbonation level using the selection toggle and CO2 is introduced to the pressure vessel at a specified pressure wherein the agitation mechanism agitates liquid within the pressure vessel forming a carbonated beverage having a selected carbonation level. Also disclosed is a process of forming a carbonated beverage in a batch.

27 Claims, 7 Drawing Sheets

US 9,723,863 B2
Page 2

(51) Int. Cl.
*A23L 2/54* (2006.01)
*B01F 11/00* (2006.01)

(52) U.S. Cl.
CPC ...... *B01F 3/04439* (2013.01); *B01F 3/04787* (2013.01); *B01F 3/04808* (2013.01); *B01F 3/04815* (2013.01); *B01F 11/0094* (2013.01); *A23V 2002/00* (2013.01); *B01F 2215/0022* (2013.01)

(58) Field of Classification Search
USPC .................. 261/26, 42, 43, 64.3, 81, DIG. 7
See application file for complete search history.

(56) References Cited

U.S. PATENT DOCUMENTS

| | | |
|---|---|---|
| 1,960,640 A | 5/1934 | Lajeunesse |
| 2,006,313 A | 6/1935 | Geddes |
| 2,209,054 A | 7/1940 | Doud et al. |
| 2,556,038 A | 6/1951 | Kollsman |
| 2,620,107 A | 12/1952 | Tolan |
| 4,124,049 A | 11/1978 | Yamaguchi |
| 4,171,580 A | 10/1979 | Vabrinskas |
| 4,208,903 A | 6/1980 | Hopper et al. |
| 4,251,473 A | 2/1981 | Gilbey |
| 4,323,090 A | 4/1982 | Magi |
| 4,481,986 A | 11/1984 | Meyers |
| 4,518,541 A | 5/1985 | Harris |
| 4,526,298 A | 7/1985 | Boxer et al. |
| 4,573,967 A | 3/1986 | Hargrove et al. |
| 4,668,219 A | 5/1987 | Israel |
| 4,681,244 A | 7/1987 | Geddie |
| 4,709,625 A | 12/1987 | Layre et al. |
| 4,719,056 A | 1/1988 | Scott |
| 4,739,905 A | 4/1988 | Nelson |
| 4,785,973 A | 11/1988 | Kobe |
| 4,808,348 A | 2/1989 | Rudick et al. |
| 4,815,635 A | 3/1989 | Porter |
| 4,820,269 A | 4/1989 | Riddell |
| 4,850,269 A | 7/1989 | Hancock et al. |
| 4,869,396 A | 9/1989 | Horino et al. |
| 4,940,212 A | 7/1990 | Burton |
| 4,976,894 A | 12/1990 | Robinson |
| 4,999,140 A | 3/1991 | Sutherland et al. |
| 5,038,976 A | 8/1991 | McMillin |
| 5,060,833 A | 10/1991 | Edison et al. |
| 5,104,158 A | 4/1992 | Meyer et al. |
| 5,118,009 A | 6/1992 | Novitsky |
| 5,152,419 A | 10/1992 | Yanagi |
| 5,156,871 A | 10/1992 | Goulet et al. |
| 5,192,513 A | 3/1993 | Stumphauzer et al. |
| 5,222,308 A | 6/1993 | Barker et al. |
| 5,260,081 A | 11/1993 | Stumphauzer et al. |
| 5,287,636 A | 2/1994 | Lafleur et al. |
| 5,299,715 A | 4/1994 | Feldman et al. |
| 5,304,130 A | 4/1994 | Button et al. |
| 5,306,242 A | 4/1994 | Joyce et al. |
| 5,358,142 A | 10/1994 | Holmes |
| 5,460,846 A | 10/1995 | Stumphauzer et al. |
| 5,531,254 A | 7/1996 | Rosenbach |
| 5,549,037 A | 8/1996 | Stumphauzer et al. |
| 5,592,867 A | 1/1997 | Walsh et al. |
| 5,634,571 A | 6/1997 | Cataneo et al. |
| D384,731 S | 10/1997 | Ramacier, Jr. et al. |
| 5,792,391 A | 8/1998 | Vogel et al. |
| 5,882,717 A | 3/1999 | Panesar et al. |
| 6,041,970 A | 3/2000 | Vogel et al. |
| 6,073,811 A | 6/2000 | Costea |
| 6,082,401 A | 7/2000 | Braun et al. |
| 6,092,811 A | 7/2000 | Bojarczuk et al. |
| 6,098,849 A | 8/2000 | McInnes |
| 6,155,781 A | 12/2000 | Tsai |
| 6,167,718 B1 | 1/2001 | Halimi et al. |
| 6,216,961 B1 | 4/2001 | Utter et al. |
| 6,439,549 B1 | 8/2002 | Loov et al. |
| 6,481,642 B1 | 11/2002 | Louis, Jr. et al. |
| 6,530,400 B2 | 3/2003 | Nelson |
| 6,688,019 B2 | 2/2004 | Buchweitz |
| 6,749,090 B2 | 6/2004 | Bailey |
| 6,755,047 B2 | 6/2004 | Kreutzmann et al. |
| 6,869,081 B1 | 3/2005 | Jenco |
| 7,048,262 B2 | 5/2006 | Cheng |
| 7,073,688 B2 | 7/2006 | Choi et al. |
| 7,086,431 B2 | 8/2006 | D'Antonio et al. |
| 7,104,531 B2 | 9/2006 | Page et al. |
| 7,114,707 B2 | 10/2006 | Rona et al. |
| 7,255,353 B2 | 8/2007 | Caplain et al. |
| 7,267,247 B1 | 9/2007 | Crunkleton et al. |
| 7,361,164 B2 | 4/2008 | Simpson et al. |
| 7,487,888 B1 | 2/2009 | Pierre, Jr. |
| 7,533,786 B2 | 5/2009 | Woolfson et al. |
| 7,784,651 B2 | 8/2010 | Batschied et al. |
| 8,024,870 B1 | 9/2011 | Ballentine et al. |
| 8,356,422 B1 | 1/2013 | Ballentine et al. |
| 8,544,688 B2 | 10/2013 | Ballentine |
| 8,622,249 B1 | 1/2014 | Ballentine |
| 9,114,368 B2 | 8/2015 | Njaastad et al. |
| 9,339,056 B2 | 5/2016 | Njaastad |
| 2002/0074369 A1 | 6/2002 | Forsman et al. |
| 2003/0075573 A1 | 4/2003 | Bailey |
| 2004/0045980 A1 | 3/2004 | Robins |
| 2004/0118942 A1 | 6/2004 | Courtney |
| 2004/0244216 A1 | 12/2004 | Poole |
| 2004/0262331 A1 | 12/2004 | Woolfson et al. |
| 2005/0251090 A1 | 11/2005 | Hoskins |
| 2006/0016511 A1 | 1/2006 | Chantalat |
| 2007/0090135 A1 | 4/2007 | Benham |
| 2007/0158371 A1 | 7/2007 | Lupfer |
| 2007/0261263 A1 | 11/2007 | Lee |
| 2008/0304356 A1 | 12/2008 | Zhuang |
| 2010/0065584 A1 | 3/2010 | Berger |
| 2010/0096040 A1 | 4/2010 | Litto |
| 2010/0203209 A1 | 8/2010 | Fishbein |
| 2010/0213223 A1 | 8/2010 | Ballentine |
| 2010/0218686 A1 | 9/2010 | O'Brien et al. |
| 2011/0020508 A1 | 1/2011 | Santoiemmo |
| 2011/0113972 A1 | 5/2011 | Tatera |
| 2011/0115103 A1 | 5/2011 | Tatera |
| 2011/0180565 A1 | 7/2011 | Racino et al. |
| 2011/0226343 A1 | 9/2011 | Novak et al. |
| 2011/0300275 A1 | 12/2011 | Lackey et al. |
| 2012/0098148 A1 | 4/2012 | Koslow et al. |
| 2012/0292790 A1 | 11/2012 | Tatera |
| 2013/0106690 A1 | 5/2013 | Lim |
| 2014/0099405 A1 | 4/2014 | Boarman et al. |
| 2014/0113045 A1 | 4/2014 | Njaastad et al. |
| 2014/0255574 A1 | 9/2014 | Njaastad et al. |
| 2014/0302212 A1 | 10/2014 | Njaastad |

FOREIGN PATENT DOCUMENTS

| | | |
|---|---|---|
| CN | 1197029 | 10/1998 |
| CN | 1326380 | 12/2001 |
| CN | 1537028 | 10/2004 |
| CN | 104039431 | 9/2014 |
| DE | 20112974 | 9/2002 |
| EP | 2719450 | 4/2014 |
| GB | 2526735 | 2/2015 |
| KR | 20140035878 | 3/2014 |
| TW | 201446197 | 12/2014 |
| WO | 95/29130 | 11/1995 |
| WO | 0187472 | 11/2001 |
| WO | 2009026541 | 2/2009 |
| WO | 2009077681 | 6/2009 |
| WO | 2009077682 | 6/2009 |
| WO | 2011/134926 | 11/2011 |
| WO | 2011134928 | 11/2011 |
| WO | 2012162762 | 12/2012 |
| WO | 2014/138667 | 9/2014 |

(56) References Cited

FOREIGN PATENT DOCUMENTS

| WO | 2015/061564 | 4/2015 |
|---|---|---|
| WO | 2015/075020 | 5/2015 |

OTHER PUBLICATIONS

Sodastream webpage [online], [retrieved on Oct. 8, 2012] Retrieved from the Internet:<URL:www.sodastream.com/fizz/>, (1 page).

iSi Twist 'N Sparkle Beverage Carbonating System YouTube video [online], isinorthamerica Mar. 23, 2011 [retrieved on Mar. 11, 2014] Retrieved from the Internet: <URL:www.youtube.com/watch?v=ySSXdwTs-cY>, (3 pages).

Perlini Carbonated Cocktail System YouTube video [online] Perlage Systems Jan. 11, 2010 [retrieved on Mar. 11, 2014] Retrieved from the Internet: <URL:www.youtube.com/watch?v=fhle9b4mjC4&feature=relmfu>, (3 pages).

Sodastream, Video Demo [online], [retrieved on Mar. 11, 2014] Retrieved from the Internet: <URL:www.sodastreamusa.com/PopUps/VideoDemo.html>, (1 page).

Fulcher How to Use the SodaStream Jet YouTube Feb. 11, 2012 [retrieved on Feb. 26, 2014] Retrieved from the Internet:<URL:http:www.youtube.com/watch?v=bf9MVEel5XM> entire video, (8 pages).

ISR and Written Opinion, PCT/US2014/022048, mailed Jun. 27, 2014.

ISR and Written Opinion, PCT/US2014/033040, mailed Aug. 27, 2014.

ISR and Written Opinion, PCT/US2013/065763, mailed Mar. 18, 2014.

ISR and Written Opinion, PCT/US2014/040509, mailed Oct. 1, 2014.

IPRP, PCT/US2013/065763, mailed Sep. 25, 2014.

International Preliminary Report on Patentability, PCT/US2014/033040, date of mailing Oct. 15, 2015.

International Preliminary Report on Patentability, PCT/US2014/022048, date of mailing Feb. 18, 2015.

GB Examination Report, GB Application No. 1506574.1, dated Mar. 1, 2017.

US 9,723,863 B2

BATCH CARBONATOR AND METHOD OF FORMING A CARBONATED BEVERAGE

CROSS REFERENCE TO RELATED APPLICATION

This application is a divisional of U.S. patent application Ser. No 13/790,687, filed Mar. 8, 2013, which is incorporated herein by reference.

FIELD OF THE INVENTION

The invention relates to carbonation apparatus and methods for forming a carbonated batch of a finished beverage.

BACKGROUND OF THE INVENTION

Current carbonated beverages may be formed by using a carbonator to carbonate a water source and then introducing a flavored syrup concentrate to make a carbonated beverage. Additionally, prior art apparatus may include a small CO2 cartridge that introduces carbonation under pressure into a vessel of water and then adding the syrup or other ingredients to create a finished beverage.

However, prior art carbonation apparatus are limited in an amount of carbonation that they introduce to the beverage because they do not agitate the beverage or have the ability to vary the pressure to influence a carbonation level. Additionally, typical prior art apparatus may be utilized to only carbonate a water source and do not carbonate a finished beverage.

There is therefore a need in the art for a method and apparatus for fast carbonation of a pre-mixed beverage or final finished beverage on an individual basis such that the carbonation level may be adjusted to various levels.

SUMMARY OF THE INVENTION

In one aspect, there is disclosed a batch carbonation apparatus that includes a housing defining a vessel cavity. The housing includes an agitation mechanism. The pressure vessel includes a cap that has a CO2 inlet and a CO2 outlet is provided. The pressure vessel also includes a seal. The pressure vessel is moveable into an out of the vessel cavity. A locking mechanism is provided and is attached to the agitation mechanism to removably lock the cap and seal relative to the pressure vessel. A CO2 source is connected to a plurality of valves where each valve has a differing pressure. A selection toggle is attached to the housing. A control mechanism is coupled to the plurality of valves. A user selects a desired carbonation level using the selection toggle and CO2 is introduced to the pressure vessel at a specified pressure wherein the agitation mechanism agitates liquid within the pressure vessel forming a carbonated beverage having a selected carbonation level.

In another aspect, there is disclosed a method of forming a carbonated beverage in a batch that includes the steps of providing a housing and agitation mechanism, providing a locking mechanism attached to the agitation mechanism, providing a pressure vessel including a seal and a cap, the cap including a CO2 inlet and CO2 outlet, introducing a liquid beverage into the pressure vessel, locking the seal and cap relative to the pressure vessel using the locking mechanism, selecting a level of carbonation, and introducing CO2 at a specified pressure for a predetermined time and agitating the liquid beverage utilizing the agitation mechanism forming a carbonated beverage having a selected carbonation level.

DETAILED DESCRIPTION OF THE PREFERRED EMBODIMENTS

In general, the carbonation process may be described utilizing Henry's Law which states that at a constant temperature the amount of a given gas that is dissolved in a given type and volume of liquid is proportional to the partial pressure of that gas in equilibrium with the liquid. By controlling the CO2 pressure at varying levels the amount of dissolved gas being absorbed allows a user to create beverages having varying amounts of carbonation to create a different taste and feel to the human palette.

The apparatus and method of the present invention may be implemented by placing a finished beverage which may include water, flavoring, syrups and other additives in a pressure vessel and pressurizing it with CO2 to allow the gas to saturate the liquid creating a carbonated beverage. By controlling the CO2 pressure introduced into the pressure vessel, the level of carbonation in a drink can be changed from a highly carbonated liquid to a lower level carbonated liquid. Agitation of the liquid within the pressure vessel reduces the time needed to saturate the liquid and improves accuracy of the carbonation.

Figure 1:
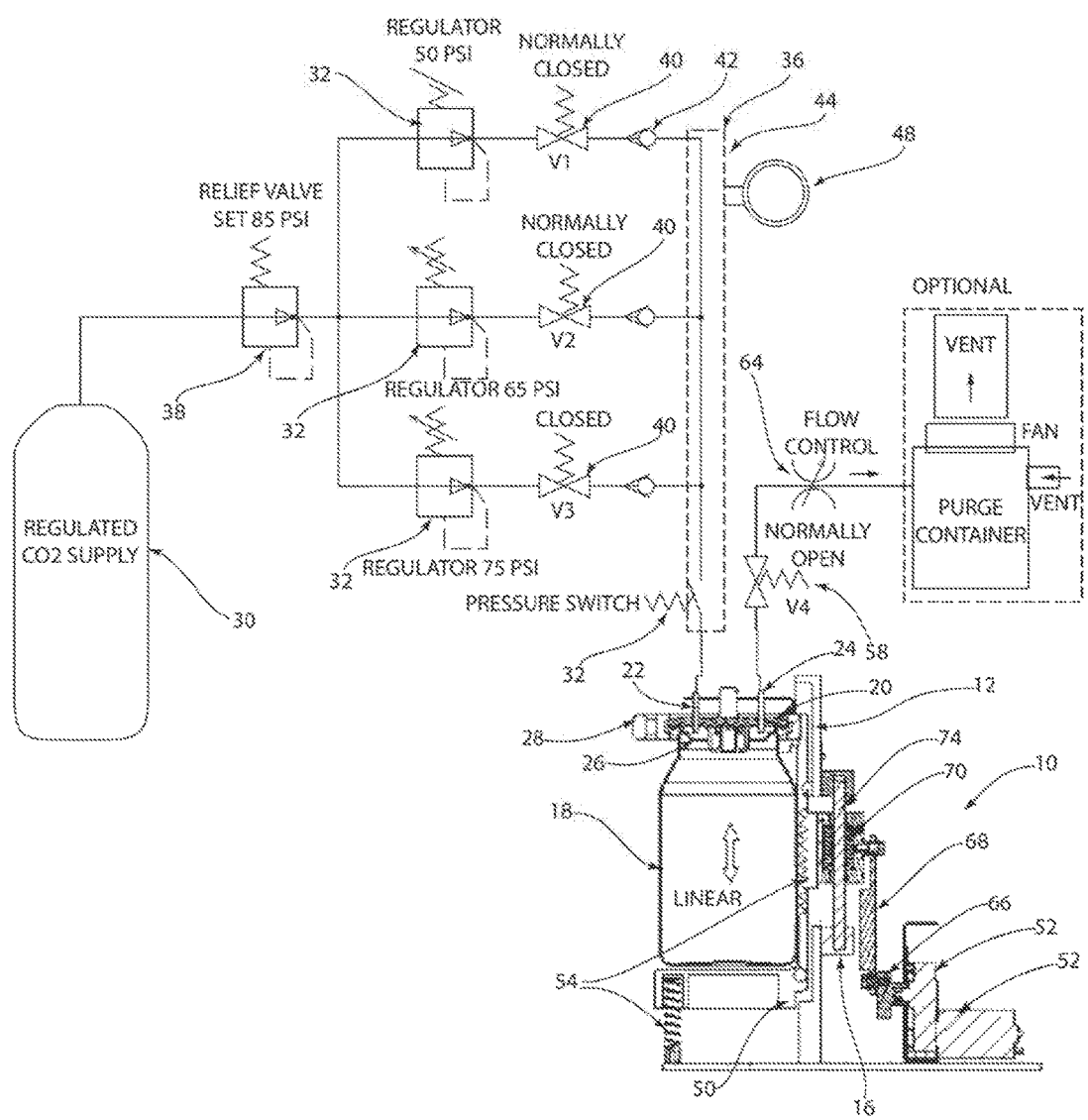
FIG. 1 is a schematic and side view of a batch carbonator apparatus.

Referring to FIG. 1, there is shown a schematic and cross-section view of a batch carbonation apparatus 10. As can be seen, a housing 12 defining a vessel cavity includes an agitation mechanism 16. A pressure vessel 18 including a cap 20 having a CO2 inlet 22 and a CO2 outlet 24 is provided. The pressure vessel 18 also includes a seal 26. The seal links the cap 20 and pressure vessel 18 and minimizes foam formed in the carbonation process of the finished beverage. The pressure vessel 18 is moveable into an out of the vessel cavity 14. The housing 12 also includes a locking mechanism 28. The locking mechanism 28 is attached to the agitation mechanism 16 and removably locks the cap 20 and seal 26 relative to the pressure vessel 18. A CO2 source 30 is connected to a plurality of valves 32 with each valve 32 having a differing pressure. A selection toggle 34 is attached to the housing 12. A control mechanism 36 is connected to the plurality of valves 32. A user selects a desired carbonation level using the selection toggle 34 and CO2 is introduced to the pressure vessel 18 to a specified pressure wherein the agitation mechanism 16 agitates liquid 36 within the pressure vessel 18 forming a carbonated beverage having a selected carbonation level.

Figure 5:
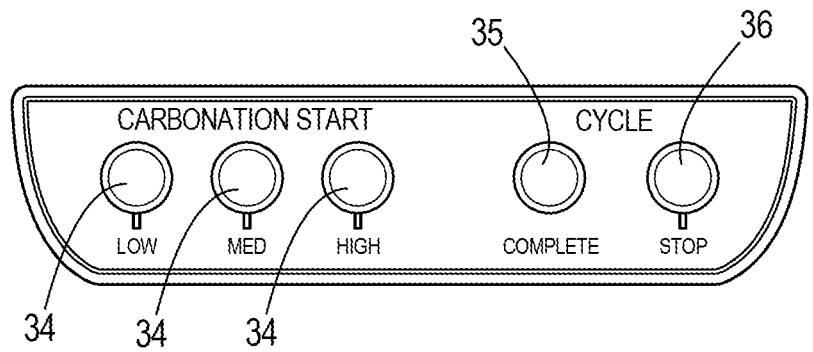
FIG. 5 is a partial view of a front of the housing including toggle switches for selecting a level of carbonation and display toggles indicating a status of the pressure vessel.

Again referring to FIG. 1, a regulated CO2 source 30 supplies carbon dioxide to the carbonation apparatus 10 and is used to carbonate a finished beverage or liquid positioned within the pressure vessel 18. A pressure relief valve 38 is provided and is set at a desired level above the working pressure of the CO2 to protect the carbonation apparatus 10 if the regulated supply of CO2 is set too high. A plurality of valves or regulators 32 are set to varying or differing pressures such as between 30 and 75 psi. The plurality of valves 32 are controlled through a series of shutoff valves 40 for each pressure regulator 32. A check valve 42 may be utilized in each line to eliminate pressure from backing up through the system which may result in malfunction of the pressure regulators or valves 32. The plurality of valves 32 are connected to a common manifold 44 that may include a pressure gauge 46 and pressure switch 48. The pressure gauge 46 may be utilized to validate pressures within the lines of each of the valves 32. When a pressure within the pressure vessel 18 is low enough, the pressure switch 48 will close and give feedback to a user utilizing a display on the housing 12, best seen in FIG. 5 or a sound letting a user know that pressure within the pressure vessel 18 is low enough to remove the pressure vessel 18 from the housing 12. The output from the manifold may be coupled to the CO2 inlet 22 formed in the cap 20. The CO2 inlet 22 may include a flexible tube that is coupled to the cap 20. In one aspect, the cap 20 floats in a clamping or locking mechanism 28 that may be utilized to attach the pressure vessel 18 and seal 26 to the agitation mechanism 16.

In one aspect, the cap 20 may be attached to a platform 50 that moves in a vertical motion using a gear reduced electric motor 52 and springs 54 that create a rapid acceleration and deceleration of the liquid 36 within the pressure vessel 18.

Figure 4:
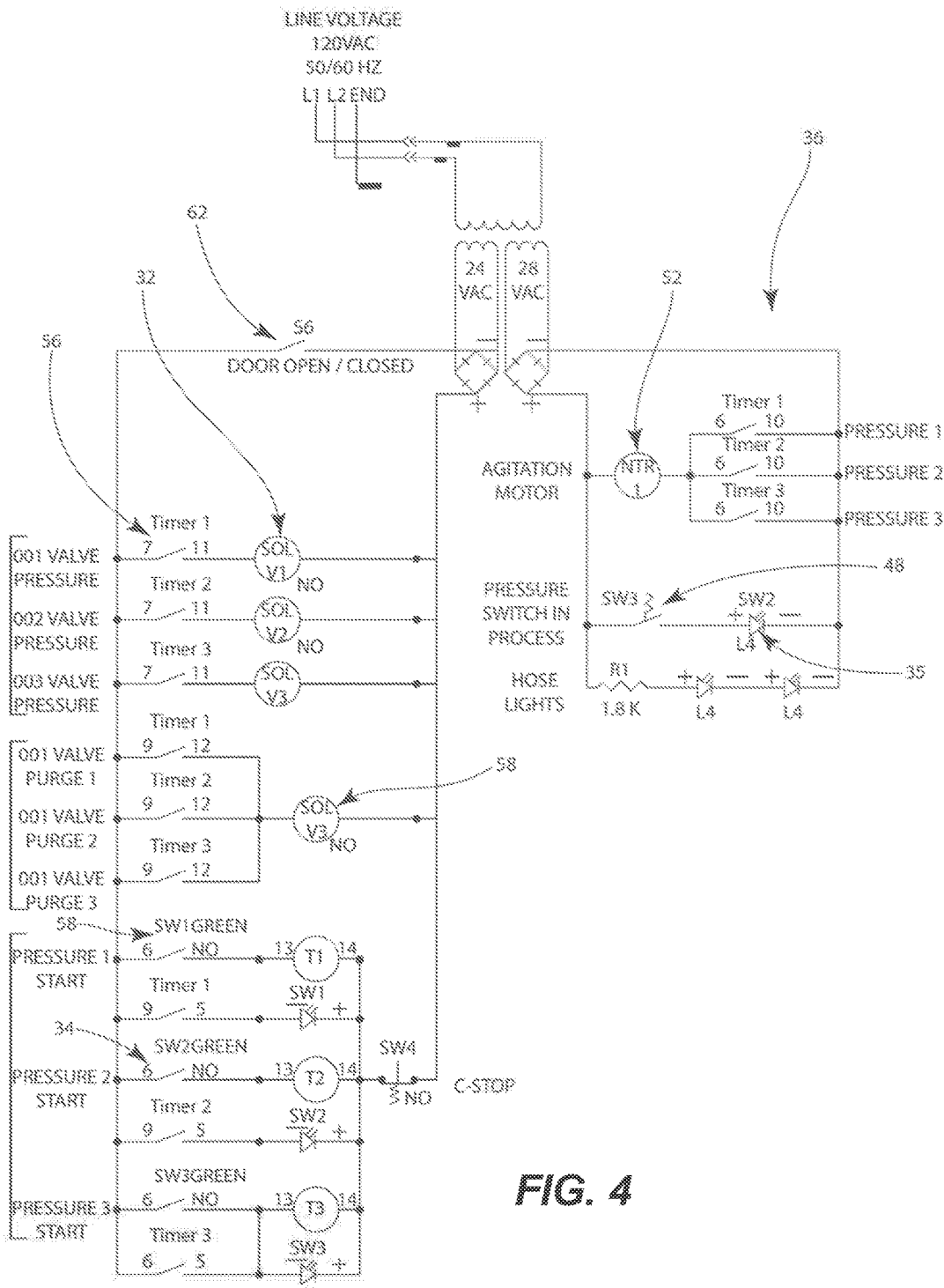
FIG. 4 is a schematic representation of the plurality of pressure valves and control mechanism for a batch carbonator apparatus.

Referring to FIG. 4, there is shown a schematic representation of the plurality of valves 32 and control system 36 of the carbonation apparatus 10. As can be seen in the figure, the plurality of valves 32 with three being shown, are controlled by timers 56 on each of the plurality of valves 32. In one aspect, the timers 56 may be four pole timers. The first set of contacts may be used as a latching circuit that is activated by the depression of the toggles 34 attached to the housing 12 for selecting a desired carbonation level. Actuation of the toggle 34 latches the timer 56 and activates the agitation mechanism 16. One of the selected plurality of valves 32 is opened and the pressure vent valve 58 which is normally open is closed. In one aspect, the pressure vent valve 58 remains normally open when the system is off or if an emergency stop toggle is actuated so that pressure within the pressure vessel 18 may be automatically purged. When a carbonation cycle is started the pressure switch 48 is actuated and turns off the display or toggle on the housing 12 signifying that there is pressure within the pressure vessel 18 and the user should not open the system. When the cycle is complete or the cycle is aborted the vent valve 58 opens and pressure within the pressure vessel 18 is released followed by actuation of a display on the housing 12 indicating pressure within the pressure vessel 18 has been purged.

Additionally, a user may close and open a door 60 attached to the housing 12 when the pressure vessel 18 is positioned within the vessel cavity 14. In one aspect, when the door 60 is closed and the pressure switch 48 senses pressure a locking mechanism 62 may lock the door 60 preventing a user from accessing the pressure vessel 18 within the housing 12. The door 60 may be unlocked if the emergency stop button is depressed and pressure within the vessel 18 is lowered to a predetermined level or if the cycle is completed and pressure within the pressure vessel 18 has been purged to the predetermined level.

As stated above, the pressure vessel 18 is removable from the housing 12. Pressure is contained within the pressure vessel 18 by positioning the seal 26 relative to the cap 20 such that the seal 26 traps a lip of the pressure vessel 18 to the cap 20. In one aspect, the seal 26 may include a vent slot formed therein. Once the seal 26 is positioned relative to the pressure vessel 18 and cap 20 the locking clamp or mechanism 28 may be hinged to allow the clamp to be opened and slide the pressure vessel 18 in place. The locking mechanism 28 may include a handle or screw knob that clamps the pressure vessel 18 to the agitation platform 50. In one aspect, the cap 20 floats in a holder that is attached to the locking mechanism or clamp 28. In this manner, the clamp may be pulled forward for loading for keeping the pressure vessel 18, seal 26 and cap 20 aligned with the clamping mechanism 28.

Again referring to FIGS. 1 and 4, the CO2 outlet or gas vent tube 24 may be utilized to vent the vessel after a carbonation cycle or process has been completed. Once the carbonation cycle or process is complete, the CO2 source 30 is shut off through the timers 56 turning off the associated valve 32. The gas vent tube 24 is connected to a normally open pressure vent valve 58 such that the system closes the pressure vent valve 58 trapping pressure within the pressure vessel 18 once the cycle is started. The pressure vent valve 58 is opened when the carbonation cycle is complete to release pressure within the pressure vessel 18. In one aspect, the venting line may be attached to an adjustable flow control valve 64 that can be adjusted to control venting of pressure from the pressure vessel 18. In one aspect, the adjustable flow control valve 64 may be replaced with a fixed orifice to define a specific venting rate.

Figure 2:
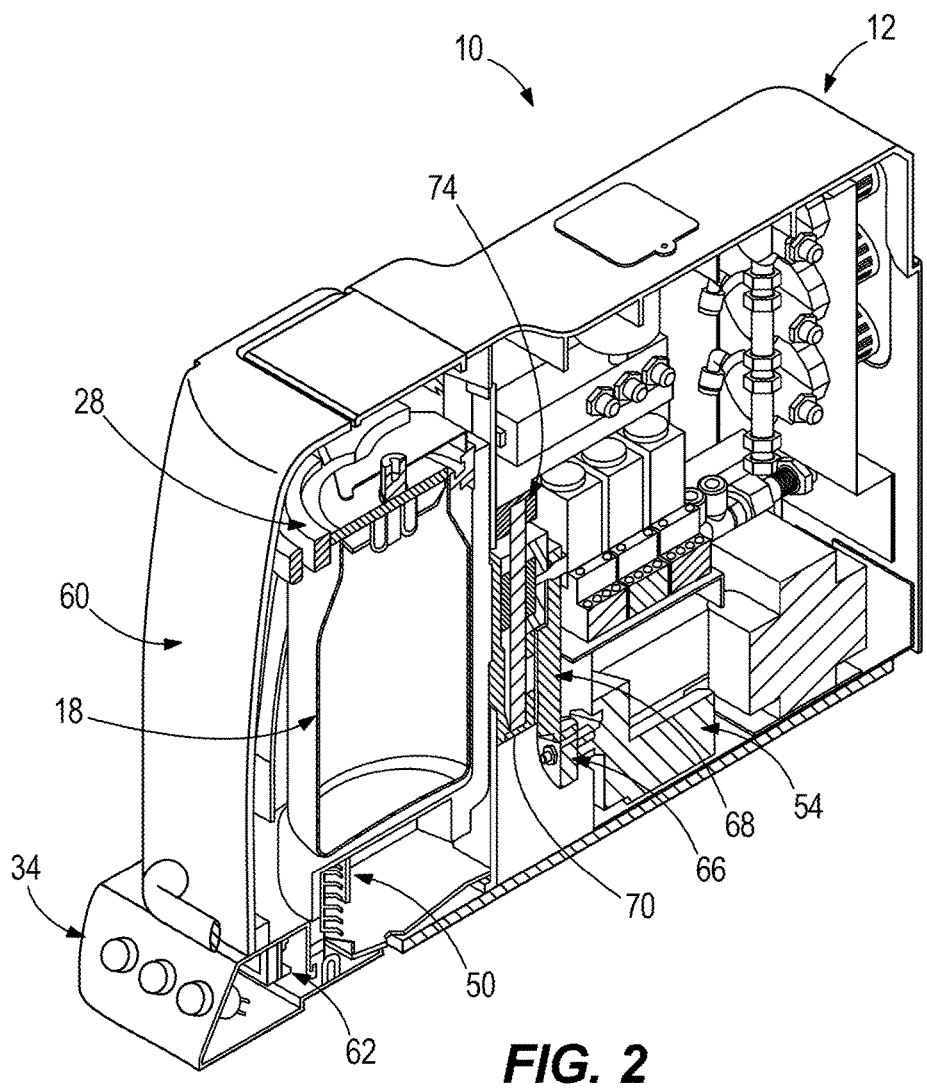
FIG. 2 is a cutaway perspective view of a batch carbonator apparatus.
Figure 3:
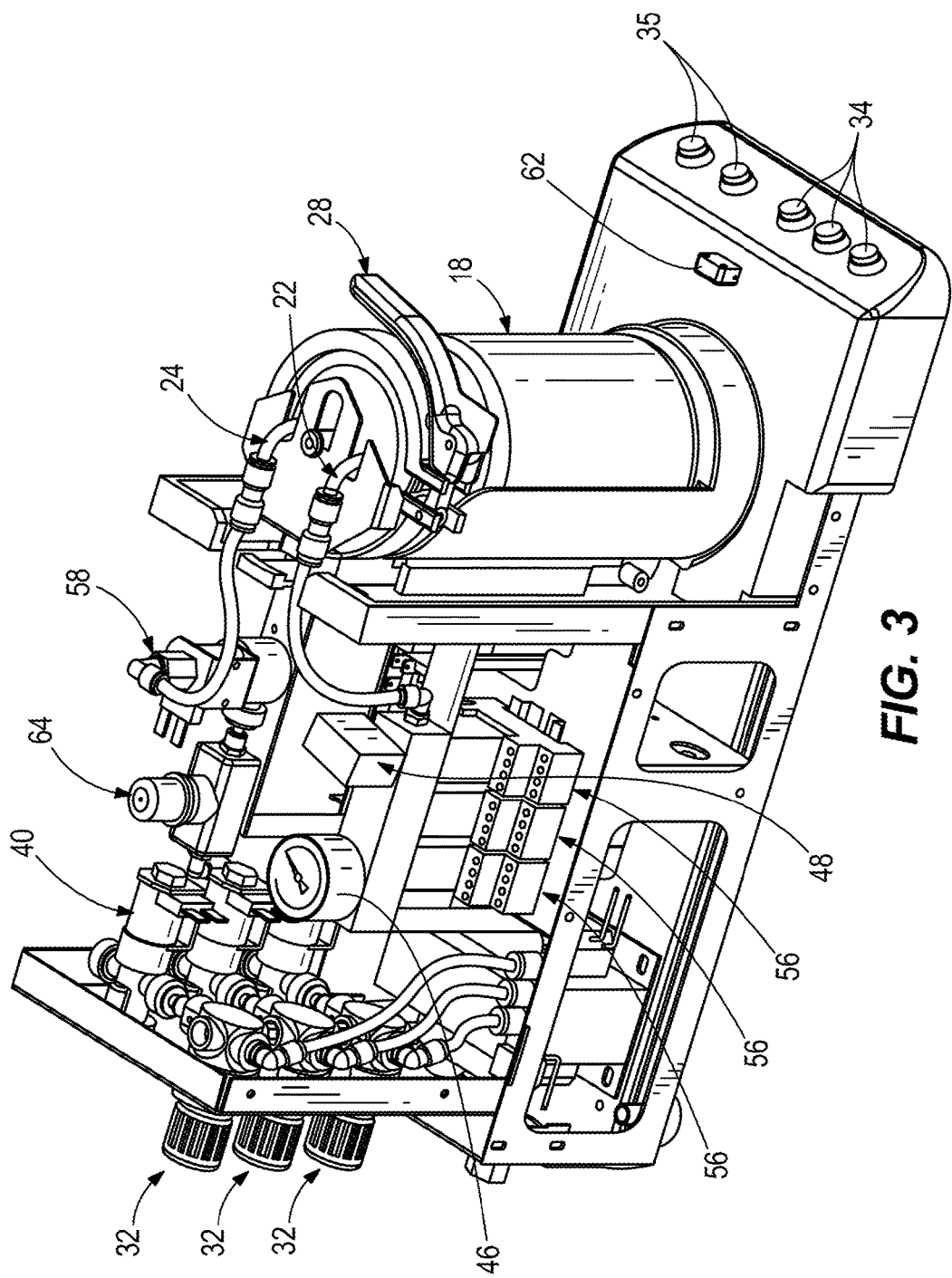
FIG. 3 is a perspective view with a portion of the housing removed for a batch carbonator apparatus.

Referring to FIG. 2, there is shown the agitation mechanism 16. In one aspect, the agitation mechanism 16 includes a platform 50 that is moved using a gear reduced electric motor 54 and cam 66 attached to a shaft of the motor 54. In one aspect, a linkage 68 is attached to the cam 66. The linkage 68 is further attached to a bearing 70 with the bearing 70 including reaction springs 72 stabilizing movement of the platform 50. An attachment rod 74 connects the bearing 70 to the platform 50. Further, springs 54 may be positioned below the platform 50 to accelerate and decelerate liquid 36 within the pressure vessel 18 as described above.

Figure 6:
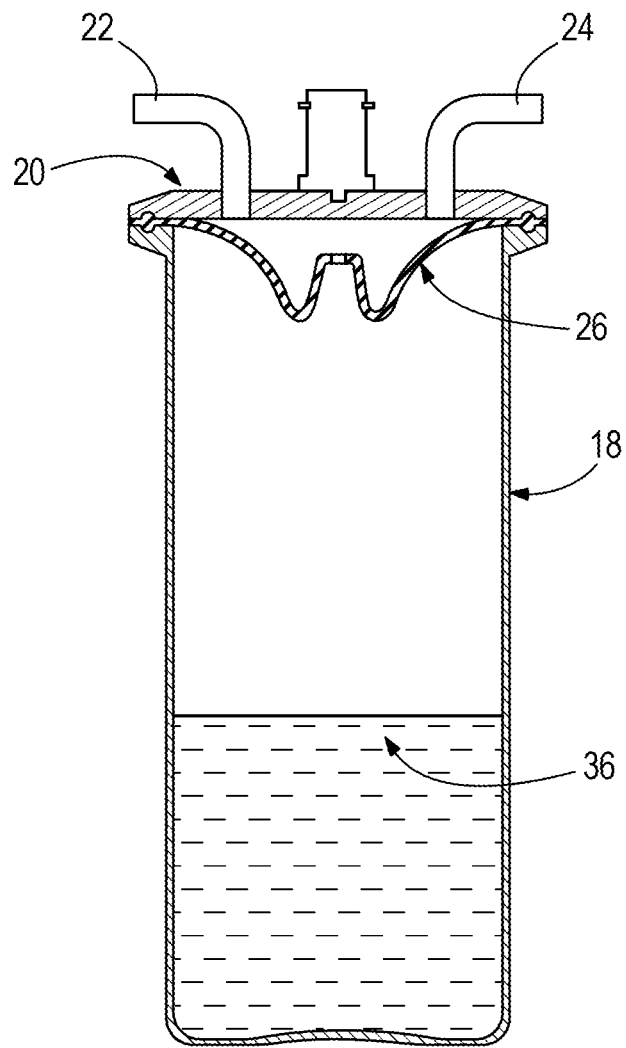
FIG. 6 is a sectional view of a pressure vessel including the seal and cap.
Figure 7:
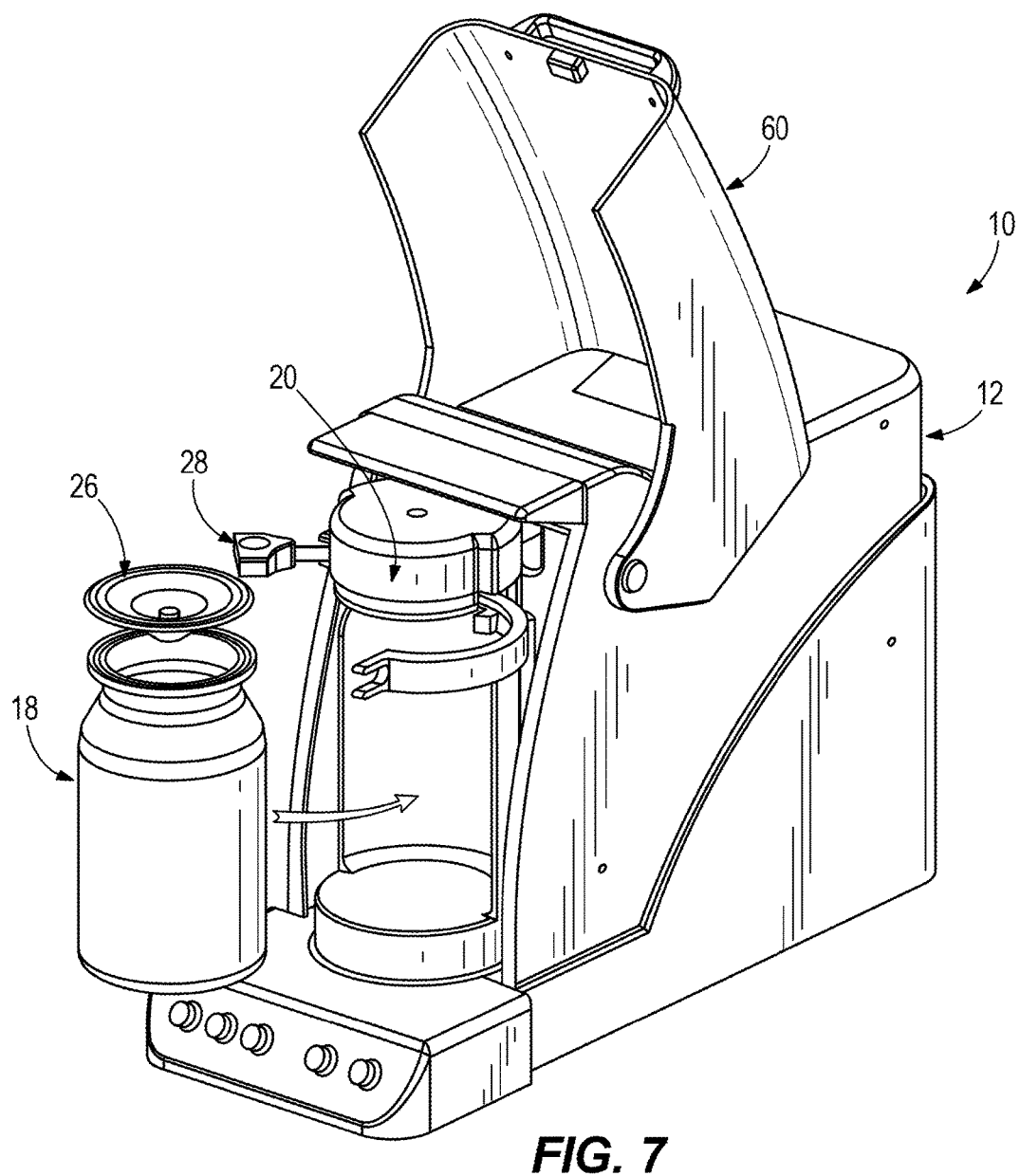
FIG. 7 is a perspective view of a pressure vessel including a seal and a locking mechanism including a cap prior to introduction of the pressure vessel within the housing.
Figure 8:
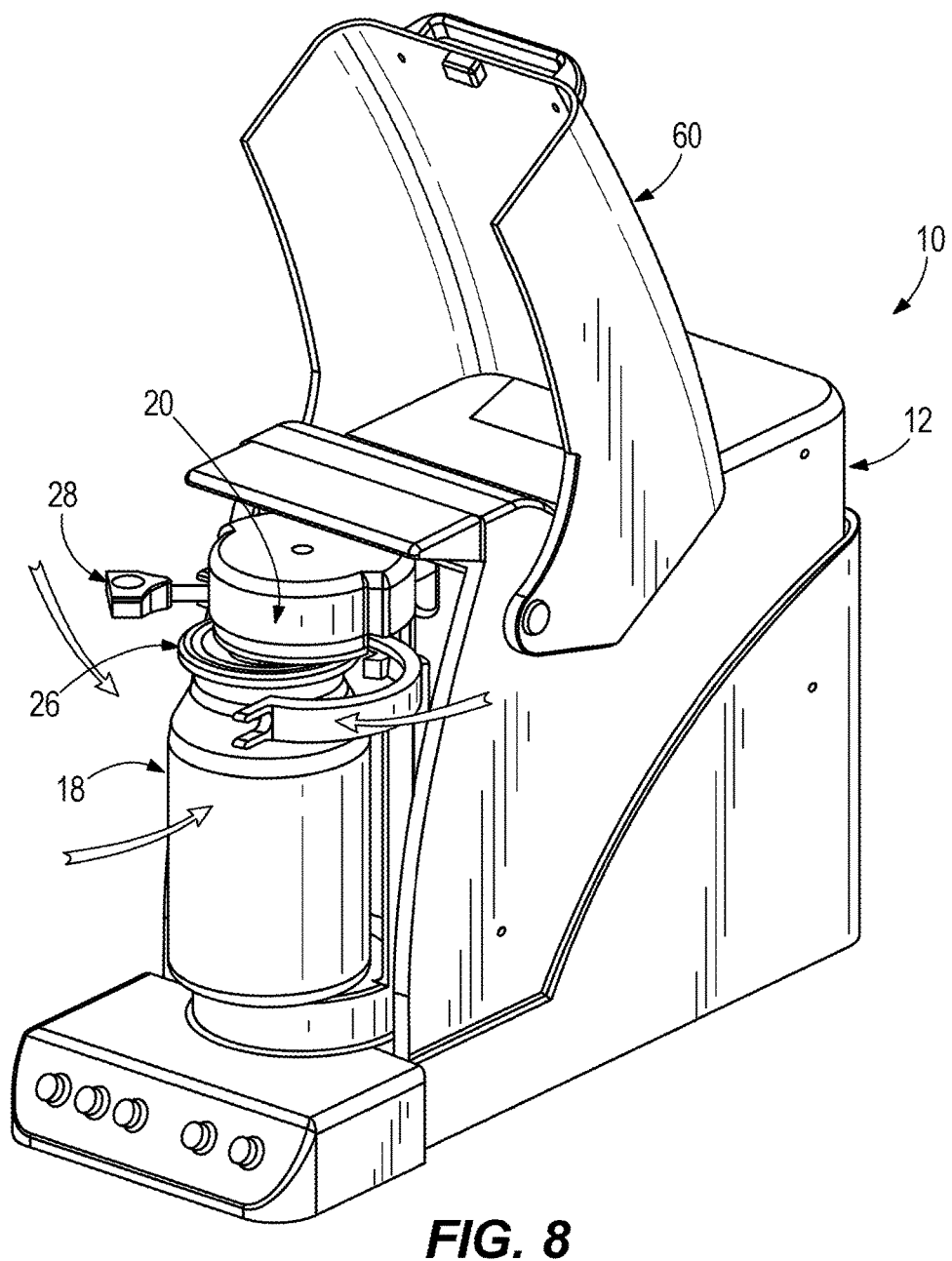
FIG. 8 is a perspective view of the pressure vessel being introduced into the locking mechanism.

Referring to FIG. 6, there is shown a sectional view of the pressure vessel 18 including a seal 26 and cap 20. In one aspect, the pressure vessel 18 may be sized such that a volume of liquid 36 within the pressure vessel 18 is ⅔ of the volume of the vessel with the remaining ⅓ of the volume being an empty space. The empty space of the liquid allows mixing of the gas and liquid under agitation.

In another aspect, there is disclosed a method of forming a carbonated beverage in a batch that includes the steps of: providing a housing 12 and agitation mechanism 16, providing a locking mechanism 28 attached to the agitation mechanism 16, providing a pressure vessel 18 including a seal 26 and cap 20, the cap 20 including a CO2 inlet 22 and a CO2 outlet 24, introducing a liquid beverage into the pressure vessel 18, locking the seal 26 and cap 20 relative to the pressure vessel 18 using the locking mechanism 28, selecting a level of carbonation, and introducing CO2 at a specified pressure for a predetermined time and agitating the liquid beverage utilizing the agitation mechanism 16 forming a carbonated beverage having a selected carbonation level.

In one aspect, the process may include the step of introducing ice to the pressure vessel 18 lowering a temperature of the liquid beverage and for improving carbonation of the liquid beverage.

In one aspect, the process may also include the step of moving a door 60 that is attached to the housing 12 such that the door 60 covers the pressure vessel 18 when the pressure vessel 18 is positioned within the housing 12. In one aspect, the door 60 may be locked relative to housing 12 when pressure is introduced into the pressure vessel 18.

The method may also include the step of purging pressure from the pressure vessel 18 through the $CO_2$ outlet 24 following formation of the carbonated beverage. As stated above, the step of purging may include unlocking of the door 60 following purging of pressure within the pressure vessel 18. In one aspect, the step of purging also includes opening a pressure vent valve 58 wherein carbon dioxide within the pressure vessel 18 passes through seal 26 and into the $CO_2$ outlet 24 of the cap 20. The $CO_2$ outlet 24 may be coupled to an adjustable flow valve 64 regulating the rate of $CO_2$ exiting the pressure vessel 18. Additionally, the purging step may include actuating a pressure switch 48 when pressure within the pressure vessel has reached a predetermined value. Additionally, actuation of the pressure switch 48 may toggle a display 35 on the housing 12 indicating pressure within the vessel has been purged and it is safe for the user to remove the pressure vessel 18.

In one aspect, the step of locking the pressure vessel 18 within the housing 12 includes positioning the seal 26 onto the pressure vessel 18 where a lip of the seal 26 contacts the pressure vessel 18, positioning the cap 20 within the locking mechanism 28, positioning the pressure vessel 18 and seal 26 in the locking mechanism 28 and actuating the locking mechanism 28 connecting the pressure vessel 18, seal 26 and cap 20 within the locking mechanism 28 and linking the pressure vessel 18 to the agitation mechanism 16.

The step of introducing carbon dioxide into the pressure vessel 18 may include actuating one of the plurality of valves 32 having a differing pressure, closing a pressure vent valve 58, actuating a pressure valve 48 wherein actuation of the pressure valve toggles a display on the housing 12 indicating pressure is being introduced into the pressure vessel 18.

As stated above, the liquid beverage may include a finished or final beverage product that includes water and additional flavoring ingredients. The batch carbonation apparatus and method of forming a carbonated beverage in a batch allows a user to select a desired carbonation level and produce a carbonated beverage from a finished beverage that includes both water and flavoring ingredients. Various liquid beverages may be introduced and are limited only by the beverage having a high enough percentage of water and low enough viscosity to allow a carbonation process to occur.

The invention is not restricted to the illustrated examples described above. The embodiments described above are not intended to limit the scope of the invention. Changes therein, other combinations of elements and other uses will occur to those skilled in the art.

The invention claimed is:

1. A method of forming a carbonated beverage comprising:
providing a housing and agitation mechanism;
providing a locking mechanism attached to the agitation mechanism;
providing a pressure vessel including a seal and cap, the cap including a $CO_2$ inlet and a $CO_2$ outlet, introducing a liquid beverage into the pressure vessel;
locking the seal and cap relative to the pressure vessel using the locking mechanism and connecting the pressure vessel to the agitation mechanism;
selecting a level of carbonation;
introducing $CO_2$ at a specified pressure for a predetermined time and agitating the liquid beverage utilizing the agitation mechanism forming a carbonated beverage having a selected carbonation level.

2. The method according to claim 1, further comprising introducing ice into the pressure vessel lowering a temperature of the liquid beverage.

3. The method according to claim 1, further comprising moving a door attached to the housing, the door covering the pressure vessel when positioned within the housing wherein the door is locked relative to the housing when pressure is introduced into the pressure vessel.

4. The method according to claim 1, further comprising purging pressure from the pressure vessel through the $CO_2$ outlet following formation of the carbonated beverage.

5. The method according to claim 4, further comprising unlocking a door after purging pressure.

6. The method according to claim 4, further comprising purging by opening a pressure vent valve wherein $CO_2$ within the vessel passes through the seal and into the $CO_2$ outlet of the cap.

7. The method according to claim 6, wherein the $CO_2$ outlet is coupled to an adjustable flow valve regulating the rate of $CO_2$ exiting the pressure vessel.

8. The method according to claim 4, further comprising purging by actuating a pressure switch when the pressure within the pressure vessel has reached a predetermined value allowing a user to remove the pressure vessel from the housing wherein actuation of the pressure switch toggles a display on the housing indicating pressure within the vessel has been purged.

9. The method according to claim 1, further comprising locking the pressure vessel by positioning the seal onto the pressure vessel wherein a lip of the seal contacts the pressure vessel, positioning the cap within the locking mechanism, positioning the pressure vessel and seal in the locking mechanism and actuating the locking mechanism connecting the pressure vessel, seal and cap in the locking mechanism and connecting the pressure vessel to the agitation mechanism.

10. The method according to claim 1, further comprising introducing $CO_2$ into the vessel by actuating one of a plurality of valves having a differing pressure, closing a pressure vent valve, actuating a pressure valve wherein actuation of the pressure switch toggles a display on the housing indicating pressure is within the vessel.

11. The method according to claim 1, wherein the liquid beverage comprises water and additional flavoring ingredients.

12. A method of forming a carbonated beverage, the method comprising:
introducing a liquid beverage into a pressure vessel;
sealing the pressure vessel;

selecting a selected level of carbonation of the liquid beverage; and introducing carbon dioxide into the pressure vessel and agitating the liquid beverage in the pressure vessel so as to form a carbonated liquid beverage having the selected level of carbonation;

wherein the liquid beverage in the pressure vessel is agitated by agitating the pressure vessel.

13. The method according to claim 12, further comprising sealing the pressure vessel by actuating a locking mechanism.

14. The method according to claim 13, wherein the locking mechanism is attached to the agitating mechanism.

15. The method according to claim 14, wherein the liquid beverage has a temperature, and further comprising lowering the temperature of the liquid beverage before or while the carbon dioxide is introduced to the pressure vessel.

16. The method according to claim 15, wherein the temperature of the liquid beverage is lowered by introducing ice into the pressure vessel.

17. The method according to claim 12, further comprising inserting the pressure vessel into a housing prior to introducing the carbon dioxide into the pressure vessel.

18. The method according to claim 12, comprising displaying a pressure within the pressure vessel on a display.

19. The method according to claim 12, comprising actuating one of a plurality of valves having different pressures in order to introduce the carbon dioxide into the pressure vessel.

20. A method of forming a carbonated beverage, the method comprising:
   introducing a liquid beverage into a pressure vessel;
   sealing the pressure vessel;
   selecting a selected level of carbonation of the liquid beverage; and
   introducing carbon dioxide into the pressure vessel and agitating the liquid beverage in the pressure vessel so as to form a carbonated liquid beverage having the selected level of carbonation;
   selecting the selected level of carbonation by actuating a toggle.

21. A method of forming a carbonated beverage, the method comprising:
   introducing a liquid beverage into a pressure vessel;
   sealing the pressure vessel;
   selecting a selected level of carbonation of the liquid beverage; and
   introducing carbon dioxide into the pressure vessel and agitating the liquid beverage in the pressure vessel so as to form a carbonated liquid beverage having the selected level of carbonation;
   venting the pressure vessel once the carbonated liquid beverage has the selected level of carbonation.

22. The method according to claim 21, wherein the pressure vessel is vented by opening a door on a housing containing the pressure vessel.

23. The method according to claim 22, comprising regulating the venting of the pressure vessel.

24. A method of forming a carbonated beverage, the method comprising:
   introducing a liquid beverage into a pressure vessel;
   sealing the pressure vessel;
   selecting a selected level of carbonation of the liquid beverage; and
   introducing carbon dioxide into the pressure vessel and agitating the liquid beverage in the pressure vessel so as to form a carbonated liquid beverage having the selected level of carbonation;
   locking the pressure vessel within a housing prior to introducing carbon dioxide into the pressure vessel.

25. The method according to claim 24, wherein locking the pressure vessel comprises positioning a seal on the pressure vessel in contact with the pressure vessel.

26. The method according to claim 25, further comprising actuating a locking mechanism to connect the seal with the pressure vessel.

27. The method according to claim 26, wherein actuating the locking mechanism links the pressure vessel to an agitation mechanism for agitating the pressure vessel.

* * * * *